Aug. 24, 1937.  A. G. THOMAS  2,091,222
OIL TESTER
Filed Sept. 21, 1934  7 Sheets-Sheet 2

Inventor
Albert G. Thomas
By Bacon & Thomas
Attorneys

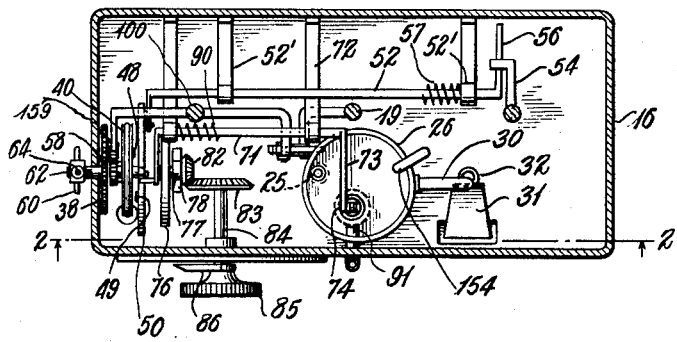
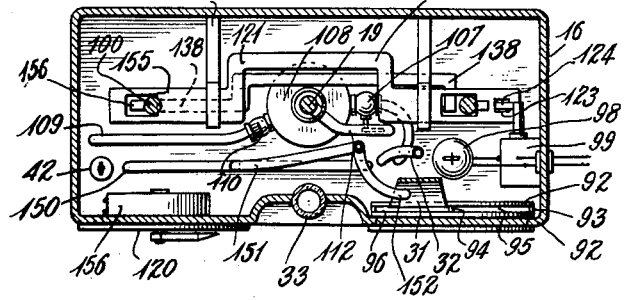
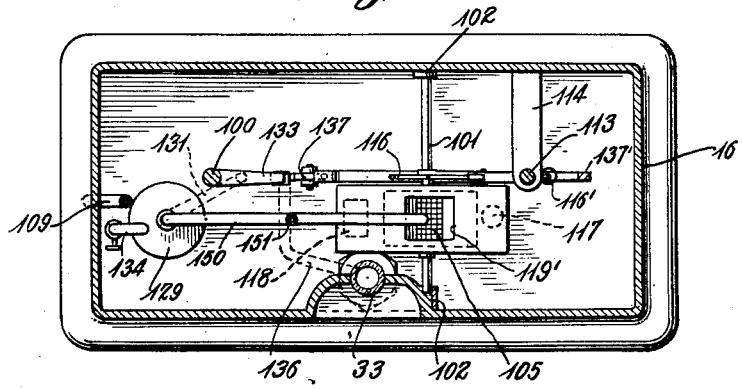

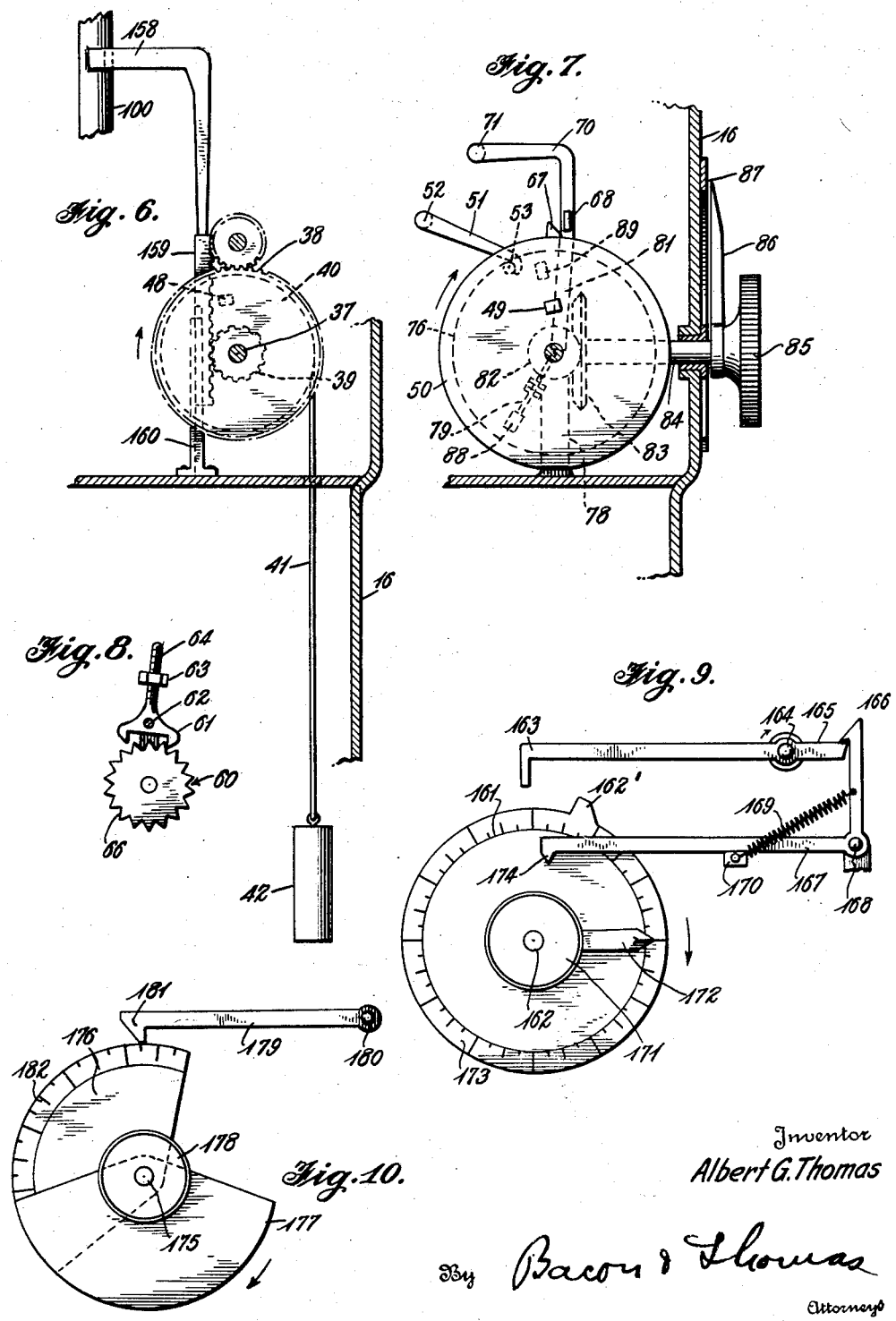

Aug. 24, 1937.                A. G. THOMAS                2,091,222
OIL TESTER
Filed Sept. 21, 1934            7 Sheets-Sheet 5
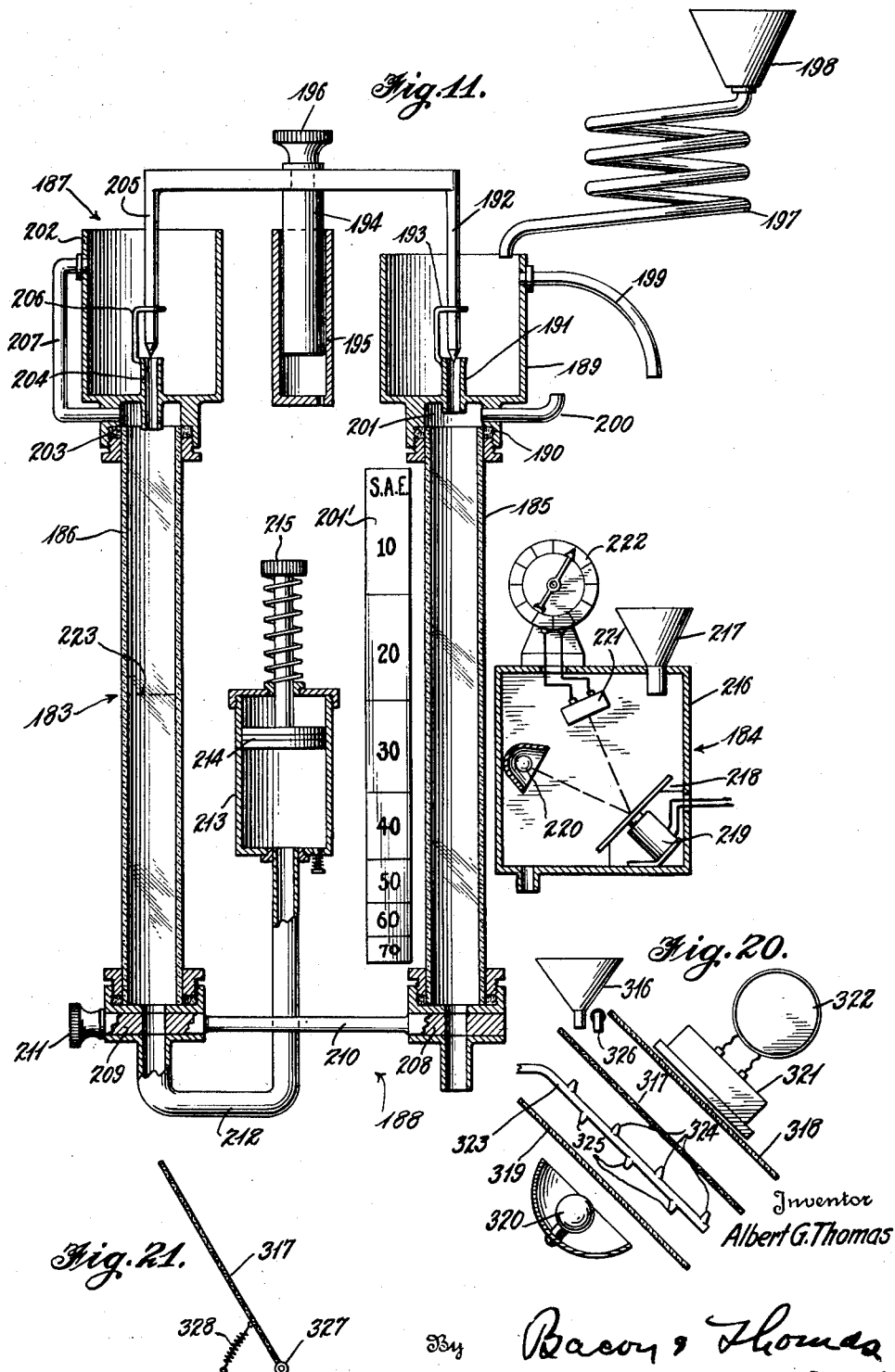

Aug. 24, 1937.  A. G. THOMAS  2,091,222
OIL TESTER
Filed Sept. 21, 1934  7 Sheets-Sheet 6
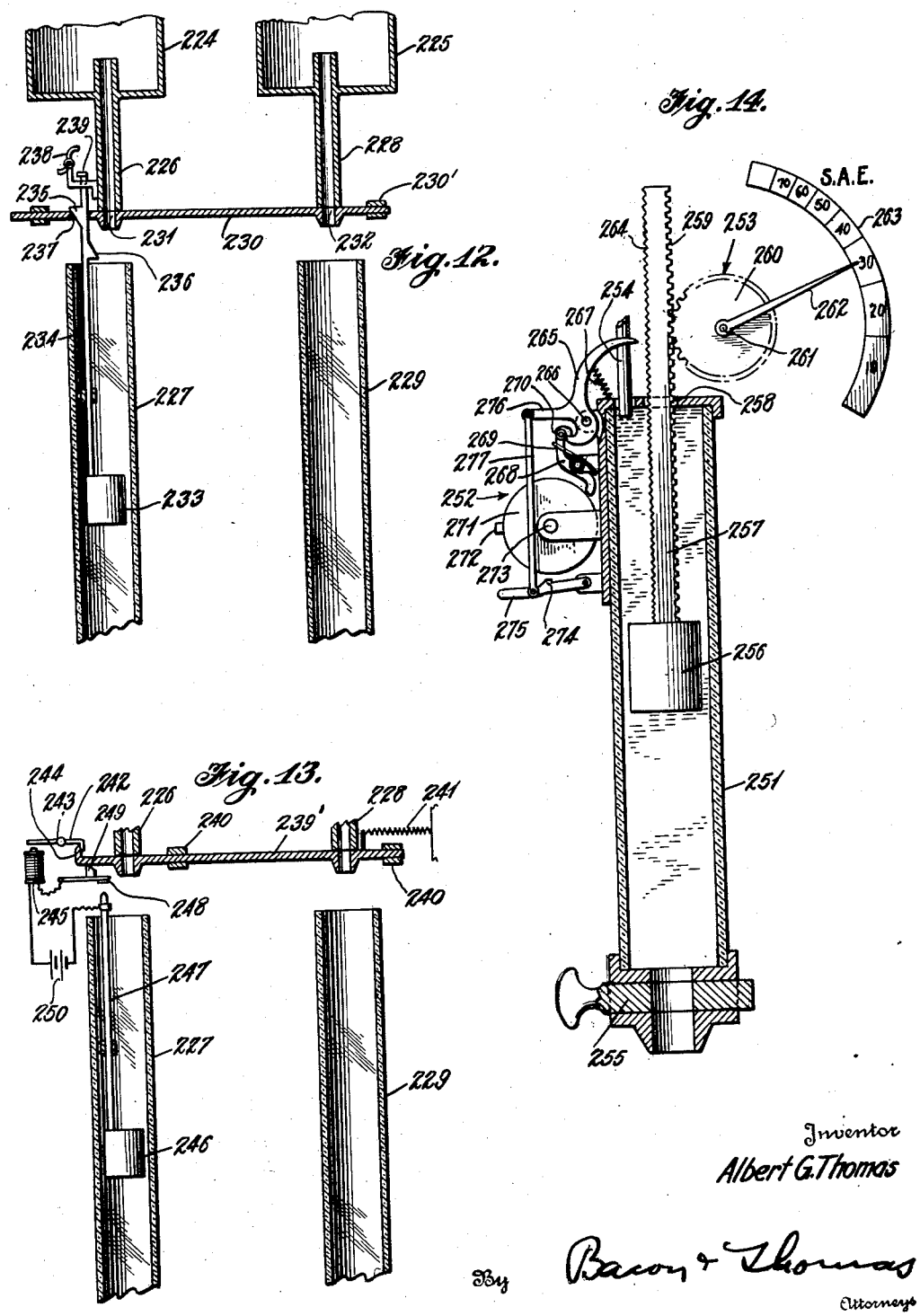
Inventor
Albert G. Thomas
By Bacon & Thomas
Attorneys Aug. 24, 1937.     A. G. THOMAS     2,091,222
OIL TESTER
Filed Sept. 21, 1934     7 Sheets-Sheet 7
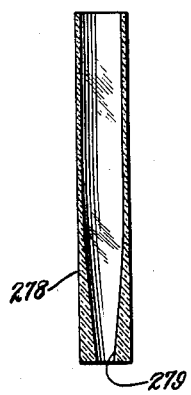
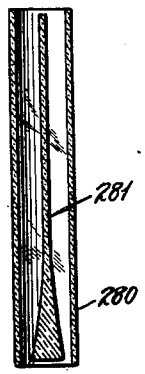
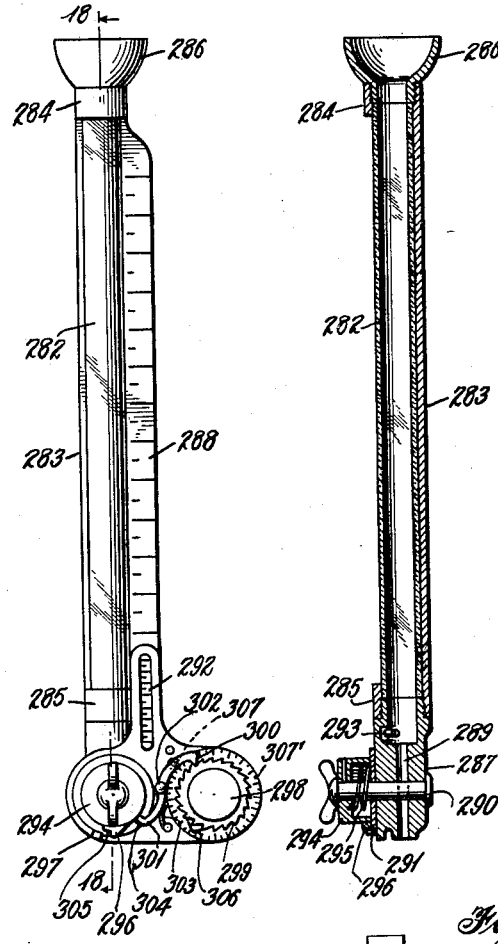
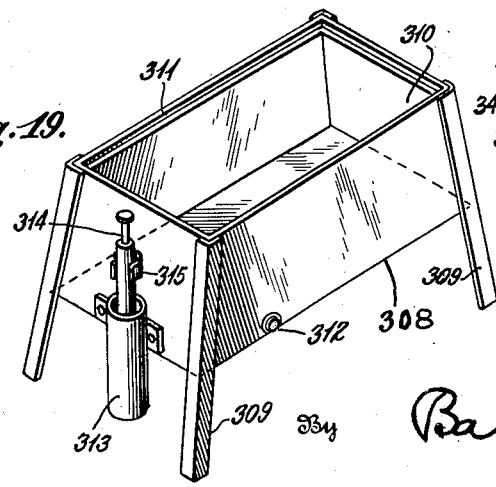
Inventor
Albert G. Thomas
By Bacon & Thomas
Attorneys Patented Aug. 24, 1937

2,091,222

UNITED STATES PATENT OFFICE 2,091,222

OIL TESTER

Albert G. Thomas, Lynchburg, Va.

Application September 21, 1934, Serial No. 744,968

18 Claims. (Cl. 265—11)

This invention relates to an oil tester and more particularly to a device for determining the viscosity of oil and the amount of deleterious foreign material contained therein.

The device is particularly useful for the testing of automobile lubricating oil by a garage or filling station attendant so as to determine the dilution and decomposition due to heat of the oil after use in an automobile and the amount of harmful sediment or solids contained therein.

Viscosity of any oil is a good indication of its lubricating qualities. Heretofore, the usual test employed by operators of filling stations has been the examination of the oil as to appearance and texture by looking at the oil and feeling it. An experienced operator can then make a rough guess as to the lubricating qualities of the oil, but such tests cannot be depended upon as being certain. Also, the amount of harmful solids contained in the oil, cannot be reliably estimated by such rudimentary tests.

It is, therefore, an object of this invention to provide a device which will determine in a simple and expeditious manner the viscosity of oil taken from an automobile crankcase and also its harmful solid content, which device is capable of being used by men who are not trained in the use of scientific instruments to obtain consistent and reliable results.

Another object of the invention is to provide a device which gives direct readings of the viscosity of the oil in any desired units and direct readings of the amount of harmful solid content with a minimum of required operations by the operator.

Another object of the invention resides in the provision of a device which will determine the viscosity of the oil referred to a constant temperature regardless of the temperature of the oil being tested, throughout an extended range of oil temperatures.

A further object of the invention is to provide a semi-automatic device provided with interlocks so that certain operations must be performed in a definite sequence.

A still further object of the invention is to provide a unitary device which will determine the viscosity of an oil, determine its harmful solid content, and provide a visual comparison of the color and light transmitting properties with a sample of a similar unused oil.

Other objects and advantages of the invention will appear in the following description of the invention shown in the attached drawings of which:

Fig. 3 is a horizontal section taken on line 3—3 of Fig. 2;

Fig. 4 is a horizontal section taken on line 4—4 of Fig. 2;

Fig. 5 is a horizontal cross section taken on line 5—5 of Fig. 2;

Fig. 6 is a detail of the timing mechanism restoring means;

Fig. 7 is a detail view showing the temperature compensating mechanism of the timing device;

Fig. 8 is a detail view of the constant speed mechanism of the timing device;

Fig. 9 is a detail view of a modification of the temperature compensating mechanism of the timing device;

Fig. 10 is a detail view of a further modification of the temperature compensating mechanism of the timing device;

Fig. 11 is an elevational view partly in section of a modification of the device;

Fig. 12 is a detail view showing a modification of the device of Fig. 11;

Fig. 13 is a detail view showing a further modification of the device shown in Fig. 11;

Fig. 14 is a sectional view showing a modification wherein the viscosity is indicated by a pointer;

Fig. 15 is a sectional view of a modified form of a viscosity tube which may be used in any of the embodiments shown in the above figures of the drawings;

Fig. 16 is a view of a further modified form of a viscosity tube;

Fig. 17 is a front elevation of a simplified form of viscosity tester;

Fig. 18 is a vertical section on line 18—18 of Fig. 17;

Fig. 19 is a perspective view of a stand for supporting an oil tester;

Fig. 20 is a diagrammatic view of a modified form of solids determining device;

Fig. 21 is a modification of the screen shown in Fig. 20; and

Fig. 22 is a fragmentary view of a modification of the device of Figs. 1 to 8.

Figure 1:
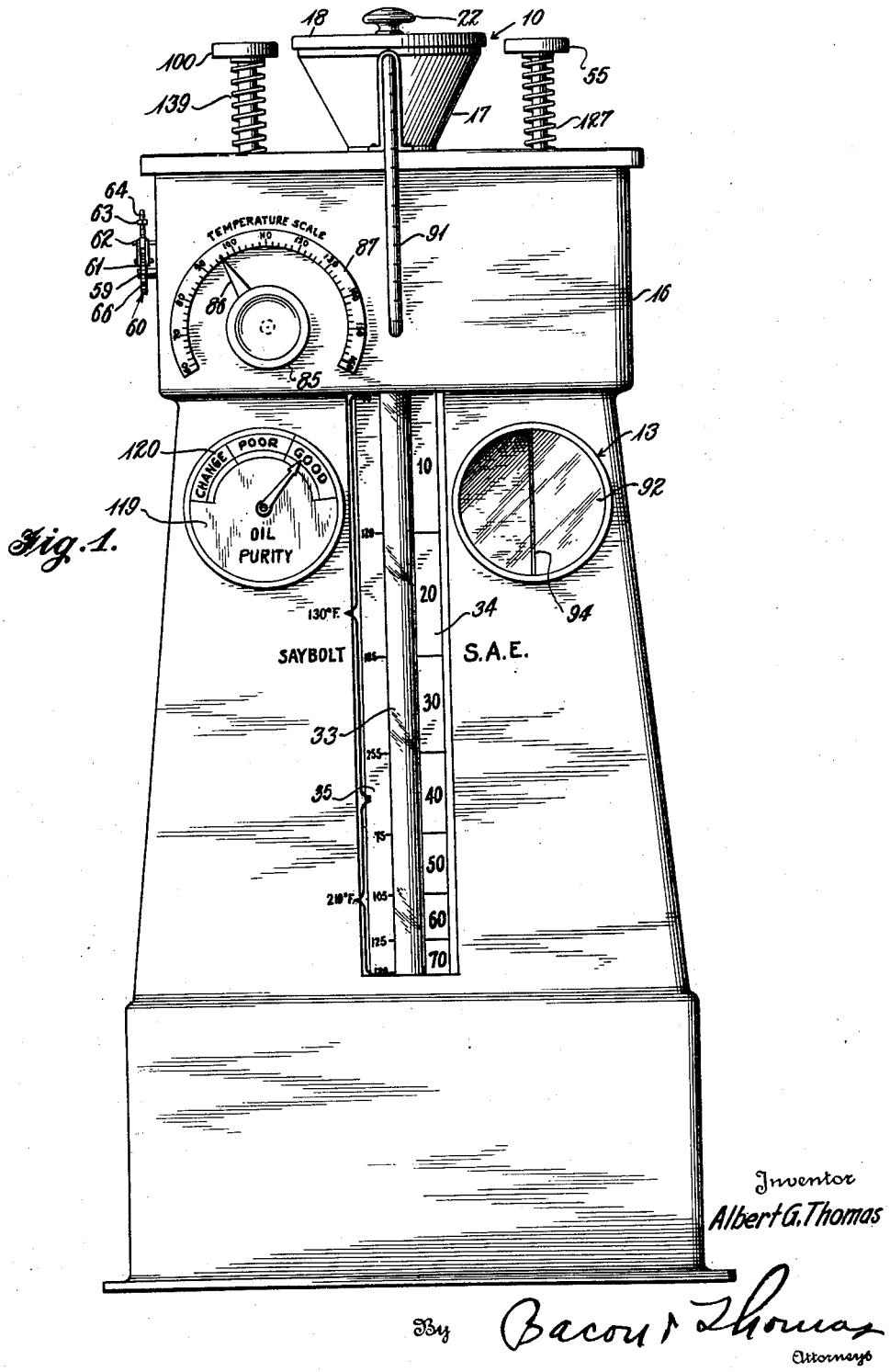
Fig. 1 is a front elevation of one modification of the device.

All of the drawings in the case are intended to be more or less diagrammatic in order to make the drawings clear and to show the essential features of the invention.

Referring more particularly to the drawings, the modification shown in Figs. 1 to 8, inclusive, will first be described. Referring to Fig. 2, the device includes an oil inlet structure indicated generally at 10, a viscosity testing mechanism indicated generally at 11, a timing device indicated generally at 12, a color comparing device indicated generally at 13, photo-electric solid content determining mechanism indicated generally at 14, and cleaning mechanism indicated generally at 15. The entire mechanism is mounted in or supported by a casing 16.

The oil inlet structure 10 includes a funnel-shaped chamber 17 mounted upon the top of the casing 16 and provided with a closure member or cap 18. The cap 18 is carried by a plunger 19 extending through a packing member or tube 20 which extends through the bottom of the chamber 17 and upwardly into said chamber to prevent leakage of oil around the plunger 19. The plunger carries at its lower end a piston 21 which provides for a slow return downwardly of plunger 19 for a purpose which will hereinafter be described. The plunger 19 carrying cap 18 may be raised by knob 22 to permit a definite quantity of used oil to be poured into the chamber 17. The cap 18 may be pivoted at 22' on rod 19 to turn up when lifted to provide more space for pouring oil. Raising of the plunger 19 also releases a latch 23 by means of a projection 24 carried by the plunger 19 to permit the closing by a spring (not shown) of a drain valve 25 in the bottom of a cup member 26 into which the oil placed in chamber 17 flows through an aperture 27 in the bottom of the chamber 17. At this time a needle valve 28, operable to close a tube 29 leading to the bottom of cup member 26, is closed and the oil from chamber 17 fills the cup 26 up to the level of an overflow tube 30 through which a portion of the oil flows to strike a deflector 31 (see Fig. 3) which deflects a portion of the overflow oil to the color comparing device 13. The overflow oil not directed by the deflector 31 is collected by a tube 32 having an enlarged opening at the upper end and directed to the photo-electric solid content testing mechanism 14.

*Viscosity testing device*

Figure 2:
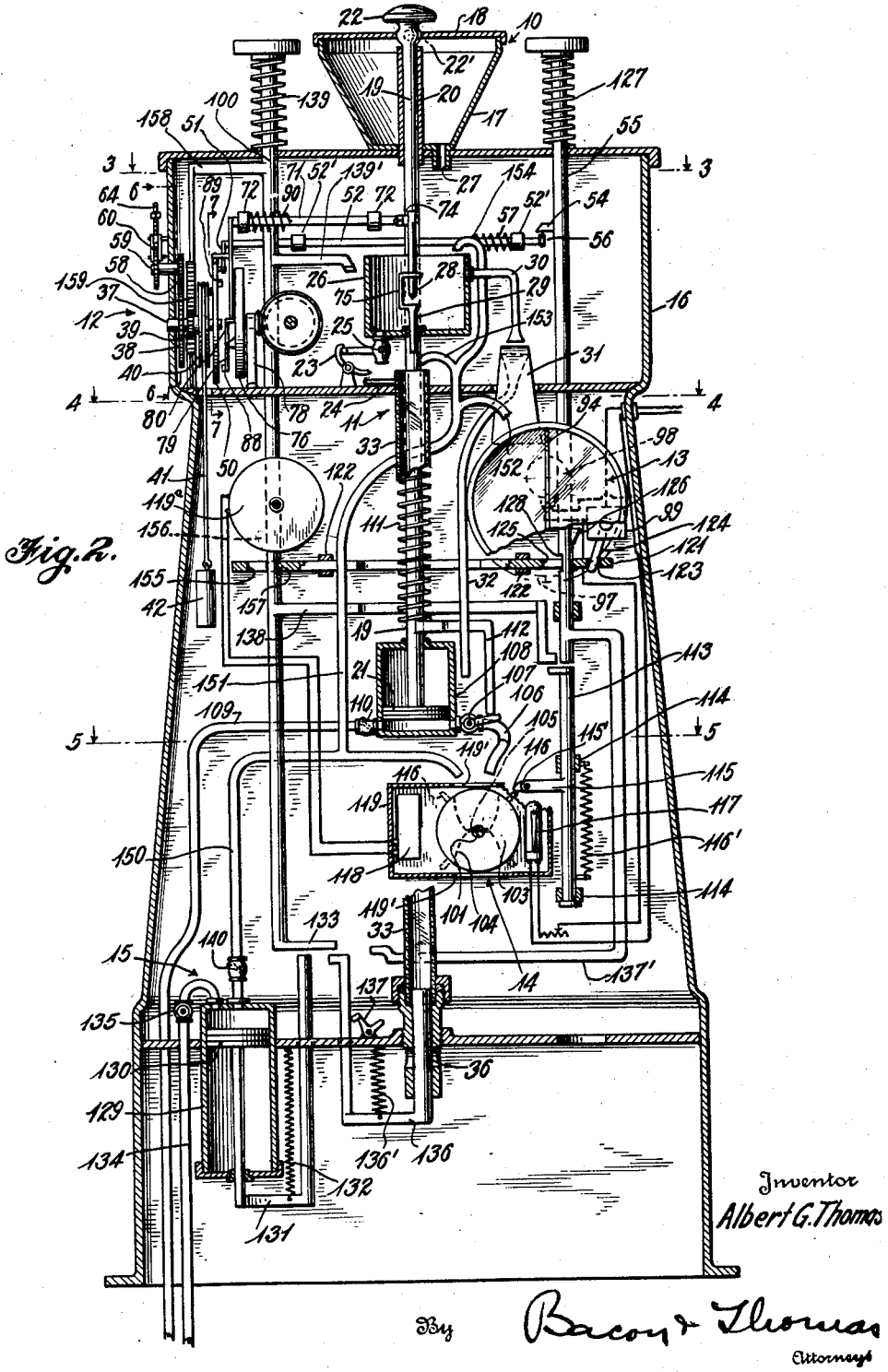
Fig. 2 is a vertical section taken on the line 2—2 of Fig. 3 with certain of the interior mechanism broken away.

The viscosity testing device comprises a transparent tube 33 mounted in the front of the casing 16 as shown in Figs. 1 and 4 and having its upper end positioned directly below the tube 29 (Fig. 2) passing through the bottom of the cup 26. After the oil has reached a constant level in the cup 26, the needle valve 28 is opened by the timing device 12 and again closed after a predetermined length of time by the timing mechanism 12, as will be hereinafter described. The oil in chamber 26 then flows through the tube 29, which has an accurately predetermined bore therethrough, into the tube 33, and the height which the oil reaches in the tube 33 in the time predetermined by the timing mechanism 12 is indicated on scales 34 and 35 mounted upon the front of the casing adjacent tube 33. The scales 34 and 35 are provided with viscosity graduations in Saybolt seconds, referred to a definite temperature and S. A. E. viscosity, respectively, and, as will be hereinafter explained, the height of the oil in tube 33 read on the scales 34 and 35 gives a very accurate determination of the viscosity of the oil regardless of the temperature of the oil supplied to the device over a wide range of temperatures. The tube 33 is closed at its lower end with a plunger valve 36 which may be operated to drain the tube 33 by mechanism hereinafter described.

*Timing mechanism*

The timing device 12 has for its purpose the opening of needle valve 28 and the closing of this valve after a predetermined time has elapsed and includes a temperature compensating mechanism shown more clearly in Fig. 7 for varying the time of opening of the valve 28, in accordance with the temperature of the oil supplied to the device. The timing device includes a shaft 37 suitably journaled, for example, in the casing 16 and having a gear 38 rigidly secured thereto. Gear 39 and pulley 40, which are rigidly secured together, are loosely mounted upon shaft 37. A flexible member 41 is wrapped around pulley 40 and carries at its lower end a weight 42 which urges the pulley 40 in a clockwise direction in Fig. 6. Pulley 40 is provided with a spring detent member 48 which engages a detent member 49 upon a disk 50 rigidly secured to the inner end of shaft 37. Disk 50 and shaft 37 are held against clockwise rotation by an arm 51 carried by a rock shaft 52 journaled in bearings 52' carried by the casing 16. The arm 51 engages a pin 53 carried adjacent the periphery of the disk 50 (Fig. 7). When the disk 50 is held against rotation in a clockwise direction by the arm 51, the pulley 40 will likewise be held against clockwise rotation by the detents 48 and 49 upon the pulley 40 and disk 50, respectively. The rock shaft 52 may be rocked in a counterclockwise direction in Fig. 7 to release the disk 50 by means of a projection 54 on the starting plunger 55 extending through the top of the casing 16 at the right in Figs. 1 and 2. The projection 54 engages an arm 56 upon the end of the rock shaft 52 remote from the arm 51. The rock shaft 52 is urged in a clockwise direction in Fig. 7 by a spring 57 (Fig. 3) which returns arm 51 to its locking position as soon as the starting plunger 55 is released.

The speed of rotation of shaft 37 and disk 50 is controlled by a constant speed device driven by gear 58 carried by a shaft 59 journaled in the frame 16 and meshing with gear 38 on the shaft 37. The constant speed device is shown more clearly in Fig. 8 and may comprise an escapement wheel 60 also carried by shaft 59 which actuates a vibrating member 61 pivoted at 62 which alternately releases teeth on the periphery of the wheel 60 in a well-known manner. The speed of wheel 60 may be controlled by adjusting a weight 63 screw-threaded upon an arm 64 of the vibrating member 61. Any other conventional constant speed device may be employed to control the rotation of shaft 37 in a clockwise direction in Fig. 7.

Returning to the timing device proper, when disk 50 is released by the actuation of arm 51 by the plunger 55 acting through rock shaft 52, disk 50 is carried in the clockwise direction in Fig. 7 by the weight 42 acting through pulley 40, at a constant speed determined by the constant speed mechanism and the weight. Disk 50 is provided with a projection 67 having a cam surface which engages a projection 68 upon an arm 70 secured to rock shaft 71 to rotate rock shaft 71 in the counterclockwise direction in Fig. 7. Rock shaft 71 is journaled in bearings 72 carried by the frame 16 and is provided at its end remote from the arm 70 with a second arm 73 pivotally connected at 74 to needle valve 28 which closes the bore in tube 29 through which oil flows into the viscosity tube 33. Needle valve 28 is slidably mounted in guide 75 carried by tube 29, and upon rocking of the shaft 71 in a counterclockwise direction in Fig. 7, the needle valve 28 is raised by arm 73 to allow oil to flow through tube 29. The valve 28 is maintained in open position for a predetermined time, depending upon the temperature of the oil, by mechanism now to be described.

Arm 70 attached to rock shaft 71 (Fig. 7) is maintained in its raised position for said predetermined time to maintain valve 28 in its open position by the temperature compensating mechanism hereinbefore mentioned. The temperature compensating mechanism includes a disk 76 secured to a stub shaft 77 journaled in a bearing 78 carried by the frame 16 (Figs. 2 and 3). Disk 76 is concentric with shaft 37 and is positioned adjacent disk 50 carried by shaft 37. Disk 76 is provided with a pivoted member 79 upon its face adjacent the disk 50. The pivoted member 79 is disposed radially of the disk 76, is pivoted intermediate its ends, and is provided with a projection 80 extending toward the disk 76 and positioned axially thereof. The arm 70 (Fig. 7) secured to the rock shaft 71 is provided with an extension 81 which rests upon the projection 80 when the arm 70 is in its uppermost position to maintain needle valve 28 open. When the timing mechanism is inactive, the extension 81 of arm 70 is not supported by the projection 80 of the pivoted member 79 but is positioned between the projection 80 and the disk 76. Pivoted member 79 is urged by a spring (not shown) so as to press the projection 80 against the center of the disk 76. When arm 70 is raised by projection 67 on disk 50, the extension 81 of arm 70 is removed from between projection 80 and disk 76 and projection 80 is thereupon pressed against disk 76, and when projection 67 of disk 50 releases arm 70, the arm 70 is retained in its upper position by its extension 81 resting upon projection 80 of the pivoted member 79 irrespective of the angular position of the disk 76.

The mechanism for closing needle valve 28 after a predetermined time depending upon the temperature of the oil will now be described. The shaft 77 to which is secured disk 76 carries at its other end a beveled gear 82 secured thereto, which gear meshes with a beveled gear 83 secured to the shaft 84 which extends at right angles to shaft 77 through the front of the casing 16, in which it is journaled. The shaft 84 is provided at its outer end with a knurled knob 85 and a pointer 86 positioned adjacent a temperature scale 87 on the front of the casing 16. Rotation of knob 85 rotates disk 76 through the beveled gears to position the radial pivoted member 79 in any desired angular position about the shaft 77. Pivoted member 79 carries at its outer end a projection 88 which is positioned in the path of a projection 89 mounted on the face of the disk 50 which is adjacent disk 76. The projection 89 on disk 50 is provided with a cam surface and continued rotation of disk 50 at constant speed by weight 42 acting through pulley 40 will cause the projection 89 on disk 50 to engage the projection 88 on the pivoted member 79 to rock the pivoted member 79 so as to remove the projection 80 thereof from under the extension 81 of arm 70. Arm 70 is thereby released and is moved to its lowermost position by spring 90 (Figures 2 and 3) surrounding rock shaft 71 and urging rock shaft 71 in a clockwise direction (Fig. 7).

Before starting the timing mechanism by actuation of plunger 55, pointer 86 (Fig. 1) is set relative to scale 87 so as to indicate the temperature of the oil delivered into cup 26, which temperature is shown by a thermometer 91 having its bulb positioned in cup 26 closely adjacent the top of tube 29 (Figs. 1 and 3). Needle valve 28 is thus maintained open for a period of time determined by the rotation of disk 50 from the time projection 67 of disk 50 strikes projection 68 on arm 70 until projection 89 of disk 50 strikes projection 88 on pivoted member 79 carried by disk 76, which time is controlled by the position of disk 76 indicated by pointer 86 on temperature scale 87.

After the projection 89 of disk 50 strikes the projection 88 on the pivoted member 79 to cause closing of the needle valve 28, disk 50 continues to be rotated by pulley 40 and weight 42 until the pin 53 is again engaged by arm 51 of rock shaft 52 to prevent further rotation. The timing mechanism is reset for a subsequent test by rotating pulley 40 one revolution in reverse or counterclockwise direction in Fig. 6 by gear 39 by means which will hereinafter be described. Rotation of pulley 40 in the reverse direction does not rotate disk 50 which is held stationary by friction or the constant speed mechanism 60. Upon the completion of one revolution of pulley 40, the spring detent 48 carried thereby snaps past detent 49 on disk 50 so that the pulley is in position to again rotate disk 50 in a clockwise direction. If desired, the specific temperature compensating means described may be omitted and the constant speed device adjusted for different constant speeds to compensate for different oil temperatures.

*Color comparing device*

The color comparing device 13 includes a pair of spaced glass plates 92, preferably circular in shape with their faces adjacent. The outer peripheries of these plates are partially sealed by an arcuate member 93, and a vertical partition 94 is provided between the plates so as to form chambers 95 and 96 between the plates. The outer plate 92 is positioned in an opening in the front wall of the casing, as shown in Fig. 1 and Fig. 4. Chamber 95 is adapted to receive a sample of unused oil, which may be sealed within this chamber. The sealing member 93 is broken away adjacent the upper portion of chamber 96 and deflector 31 extends into said chamber 96 so as to direct a portion of the overflow oil from the overflow tube 30 of cup 26, as heretofore described. Chamber 96 may be further provided with an opening 97 (Fig. 2) through which oil introduced therein may gradually escape. An electric lamp 98 (Figs. 2 and 4) may be positioned directly back of said color comparing device 13 so that the light therefrom will shine through the glass plates 92 and the chambers 95 and 96 containing the oils to be compared. The lamp 98 is automatically lighted upon depression of starting plunger 55 by a switch 99 and automatically extinguished by resetting plunger 100 extending through the upper portion of the casing at the left in Fig. 2, by mechanism which will be hereinafter described. It will thus be seen that the color comparing device 13 provides for visual inspection of the used oil relative to a sample of unused oil.

*Solid content determining mechanism*

The mechanism for determining the harmful solid content will now be described. This mechanism includes a rotary member 101 rotatably mounted in bearings 102 (Figs. 2 and 5) carried by the casing 16. The rotary member 101 is positioned to have its axis horizontally disposed and comprises a cylindrical portion 103 having diametrically disposed chambers 104 communicating at their inner ends adjacent the center of the rotary member 101. A fine mesh screen 105 or equivalent structure, as disclosed in my copending application Serial No. 702,599, filed December 15, 1933, is positioned between chambers 104 so as to form a partition therebetween. Rotary member 101 is normally positioned with one of the chambers 104 directed upwardly, as shown in Fig. 2. A portion of the oil which overflows from cup 26 through pipe 30 is collected by tube 32 and delivered into the upwardly directed chamber 104 so as to pass through screen 105.

As used oil is delivered onto the screen 105, a small stream of diluent such as kerosene is also directed onto the screen by pipe 106 terminating directly above the rotary member 101. Pipe 106 is connected through valve 107 to a cylinder 108 in which is positioned piston 21 carried by the lower end of plunger 19, as hereinbefore described. When plunger 19 is moved upwardly to allow used oil to be poured into chamber 17, piston 21 is moved upwardly in cylinder 108 to draw a quantity of diluent through pipe 109 and check valve 110 from a source of diluent. Valve 107 is normally slightly opened when plunger 19 is raised and a small quantity of air is also drawn into cylinder 108. When plunger 19 is released, spring 111 urges the plunger 19 of the piston 21 downwardly. Since valve 107 is slightly open, a small stream of diluent is forced through tube 106 onto the screen 105 and the plunger 19 is allowed to move slowly downward. This stream of diluent dilutes the used oil in chamber 104 and washes said oil through the screen 105, leaving any solid matter in the oil above a predetermined size, determined by the size of the openings in the screen 105, upon the screen. When plunger 19 carrying piston 21 approaches its lowermost position, an arm 112 carried by the plunger 19 adjacent its lower end strikes the operating lever of valve 107 to completely open said valve. Piston 21 thereupon rapidly falls and a relatively large stream of diluent is projected upon screen 105 to more thoroughly wash the oil and finer particles therefrom, which stream is followed by a blast of air which blows any remaining diluent out of the meshes of the screen. Valve 107 is urged by a spring (not shown) toward the closed position but, as above stated, is retained in a slightly open position by a stop when plunger 19 and arm 112 thereof are raised.

Upon depression of starting plunger 55, the lower end thereof contacts a plunger 113 sliding in guides 114. The plunger 113 carries an arm 115 terminating in a pivoted pawl 115' which engages one of four radial projections 116 carried by rotary member 101 to rotate the rotary member ninety degrees in a clockwise direction in Fig. 2. Plunger 113 is urged upwardly by spring 116' and may be returned to its upward position thereby without rotating rotary member 101 in a reverse direction. Pivoted pawl 115' snaps over the next adjacent projection 116 so as to be in position to cause another ninety-degree rotation of the rotary member 101. This rotation of member 101 positions the screen 105 directly between an electric lamp 117 and a photo-electric cell 118 both being positioned in a casing 119 which also surrounds the cylindrical portion 103 of the rotary member and is provided with apertures 119' to permit the delivery of oil or diluent to the screen 105 and the discharge therefrom. Electric lamp 117 is connected in parallel with lamp 98 of the color comparing device, and depression of the starting plunger 55 operating switch 99 likewise causes lamp 117 to light. Light passing through screen 105 supporting the harmful solid material of the oil falls upon photoelectric cell 118 to cause a voltage to be impressed across a milliammeter 119a positioned to have its face exposed through an opening in the front wall of the casing 16, as shown in Figs. 1 and 2. The milliammeter may be calibrated to have full scale deflection when no solid matter is present upon screen 105 and during operation will give a lesser reading, depending upon the amount of material upon said screen. The milliammeter may be provided with a scale 120 indicating whether the oil is good, poor, or should be changed.

The switch 99, which is operated to energize lamps 98 and 117, is preferably actuated by an interlocking slide 121 sliding in bearings 122 carried by the casing 16. The slide 121 is provided with an aperture 123 into which extends the operating arm 124 of the switch 99. Switch 99 is of the quick snap type so that the arm 124 is maintained in either of its extreme positions by spring action and must be carried past dead center to operate the switch. Since such switches are well-known, it is not believed necessary to further describe the details thereof. Slide 121 in Fig. 2 is shown in its extreme position toward the left, in which position arm 124 of switch 99 is in the "off" position. The slide 121 is further provided with an elongated aperture 125 through which starting plunger 55 projects. Upon depression of starting plunger 55, a wedge-shaped projection 126 engages the right end of aperture 125 (Fig. 2) to force the slide 121 toward the right. Arm 124 of the switch 99 is thereby carried past its center and urges slide 121 further toward the right, in which position the left end of aperture 125 bears against starting plunger 55. When starting plunger 55 is returned to its upper position by spring 127 positioned on top of casing 16, the left end of aperture 125 of slide 121 snaps into notch 128 provided in starting plunger 55 so as to prevent another depression of starting plunger 55 until after slide 121 has been returned to its position toward the left (Fig. 2) so as to again operate switch 99 to the "off" position by mechanism hereinafter described.

*Cleaning and resetting mechanism*

The device is also provided with a mechanism for forcing a diluent or cleaning fluid through all of the testing portions of the device which come in contact with the used oil. This mechanism is operated by the resetting plunger 100 and comprises a cylinder 129 in which is positioned a piston 130 carried by a plunger 131 which is urged in an upward direction by spring 132. Resetting plunger 100 carries an arm 133 at its lower end which engages plunger 131 to force the piston 130 carried thereby downwardly in Fig. 2 to draw into the cylinder 129 a charge of cleaning fluid through pipe 134 and check valve 135 from a source of cleaning fluid not shown. Arm 133 of resetting plunger 100 also engages a plunger 136 carrying the movable portion of valve 36 in the bottom of viscosity tube 33 so as to carry plunger 136 downwardly against the spring 136' to open valve 36. Plunger 136 is retained in its downward position by a spring-pressed latch 137 which engages the upper end of plunger 136 to maintain valve 36 open so as to allow viscosity tube 33 to drain. The valve 36 is closed prior to the next test by the spring 136' when the latch 137 is tripped by an arm 137' carried by the starting plunger. Resetting plunger 100 also carries an arm 138 intermediate its ends which engages plunger 113 of the solid testing device 14 to force the plunger 113 downwardly when resetting plunger 100 is depressed. As hereinbefore described, arm 115 of plunger 113 engages one of the radial projections 116 on rotary member 101 to turn this member through a further angle of ninety degrees, thus completely inverting screen 105 so as to position the solids thereon upon its lower surface. Resetting plunger 100 also carries arm 139' adjacent its upper end which, upon depression of plunger 100, strikes the operating lever of drain valve 25 of cup 26 so as to operate the valve to open position and so as to cause the operating arm thereof to be engaged by latch 23 which maintains the valve in open position until closed by actuation of plunger 19, as hereinbefore described. Upon return of resetting plunger 100 to its upper position by spring 139 positioned above the top of the casing 16, piston 130 in cylinder 129 is moved upwardly by spring 132 to deliver cleaning fluid through check valve 140 and pipe 150 which terminates directly above the screen 105 of the solid testing mechanism 14 to wash the deposited solids therefrom. A portion of the cleaning fluid is directed upwardly from pipe 150 through a branch pipe 151 to supply cleaning fluid to other portions of the apparatus. A branch pipe 152 from pipe 151 terminates above chamber 96 of color comparing device 13 and adjacent deflector 31 so as to wash used oil from between the plates of the color comparing device 13. Another branch pipe 153 terminates above the opening in the upper end of viscosity tube 33 so as to direct cleaning fluid down therethrough. A third branch pipe 154 terminates above cup 26 so as to wash used oil therefrom.

Also, resetting plunger 100 extends through an aperture 155 in the interlocking slide 121. A wedge-shaped projection 156 upon depression of resetting plunger 100 engages the left end of aperture 155 to force the interlocking slide 121 toward the left. This movement of slide 121 actuates switch arm 124 past its center position toward the left so as to actuate switch 99 to the "off" position, thereby extinguishing lamps 98 and 117. The leftward motion of slide 121 removes the left end of aperture 125 from the notch 128 in starting plunger 55 to release said starting plunger. The spring-urged arm 124 of switch 99 urges slide 121 further toward the left so that the right end of aperture 155 of slide 121 is in position to snap into a notch 157 in resetting plunger 100 to prevent another actuation of resetting plunger 100 until starting plunger 55 has been actuated to move slide 121 toward the right. Resetting plunger 100 also carries an arm 158 adjacent its upper end which engages a rack 159 vertically slidable in a guide 160 carried by the casing 16 (Figs. 2 and 6) to force said rack downwardly. The rack 159 meshes with gear 39 upon the timing mechanism shaft 37 so that downward movement of the rack 159 causes rotation of shaft 37 and pulley 40 to raise weight 42 to reset the timing mechanism.

The complete operation of the device thus far described is as follows: Before starting an oil test, the various elements of the apparatus are in the positions shown in Figs. 2 to 5 inclusive. A measured quantity of oil is withdrawn from the crankcase of an internal combustion engine or other source of used oil to be tested and the plunger 19 of the device raised by knob 22 to lift cover 18 of the chamber 17. Raising of this plunger trips the latch 23 to allow the drain valve 25 of the cup 26 to close by spring action. At the same time arm 112 of plunger 19 is raised to allow valve 107 of the cylinder 108 to partially close, and piston 21 in cylinder 108 is raised to draw a charge of diluent and air into cylinder 108. The used oil is then poured into chamber 17 and plunger 22 released. The used oil runs down through aperture 27 in the bottom of chamber 17 into cup 26 and fills this cup up to the level of the overflow pipe 30. The amount of oil placed in chamber 17 is sufficient to cause a definite quantity of oil to overflow through pipe 30 and strike the deflector 31 positioned directly below the outlet thereof. The deflector divides the stream of oil issuing from pipe 30 and delivers a portion of this oil into chamber 96 of the color comparison device 13. Another portion of the used oil is collected by the enlarged upper end of pipe 32 and delivered onto the screen 105 of the solids determining mechanism 14. During this time the plunger 19 is being pulled slowly down by spring 111, which motion is controlled by the diluent in cylinder 108 being forced out through partially open valve 107. The diluent being forced through valve 107 is directed by pipe 106 onto the screen 105 of the solids determining mechanism to wash the used oil therethrough so as to leave the harmful solids of the used oil positioned upon the upper portion of the screen 105. When the plunger 22 approaches its lowermost position, the arm 112 thereof strikes the control lever of valve 107 to open this valve. Plunger 22 is immediately forced to its lowermost position by spring 111, and the remaining diluent and air in cylinder 108 is quickly discharged through pipe 106 to complete the washing of the used oil upon screen 105, and the blast of air is effective to blow the used oil and diluent from the meshes of the screen 105 to leave only the solids deposited thereon. The device may be adjusted to omit the blast of air, if it is desired to test the diluted oil film.

When plunger 22 has reached its lowermost position, the operator notes the temperature registered by thermometer 91 (Figs. 1 and 3), which has its bulb position in the oil in cup 26, and sets the pointer 86 of the temperature compensating device at the temperature on scale 87 indicated by the thermometer 91. After adjusting the temperature compensating device, which is held in place by friction, the operator depresses starting plunger 55. Depression of this plunger 55 causes arm 137' carried by the lower end of plunger 55 to strike the latch 137 to release plunger 136 carrying valve 36 in the lower end of viscosity tube 33. Spring 136' returns this plunger to its upper position to close valve 36. Upon depression of plunger 55, arm 54 carried near the upper end thereof strikes the arm 56 of rock shaft 52 to rotate this shaft in a counterclockwise direction in Fig. 7. This rocking motion of rock shaft 52 disengages arm 51 thereof from the pin 53 of disk 50 of the timing mechanism. Upon release of disk 50, rotation of this disk in a clockwise direction in Fig. 7 is effected by weight 42 rotating pulley 40 which rotates disk 50 by the detents 48 and 49. The rotation of disk 50, which is fast on shaft 37, is controlled by the constant speed device 60 operated by gears 38 and 58 which are fast on shafts 37 and 59, respectively.

Immediately after disk 50 is released, the projection 67 carried on the periphery thereof strikes projection 68 on the arm 70 of rock shaft 71 to rotate rock shaft 71 in a counterclockwise direction in Fig. 7. This rotation of rock shaft 71 raises arm 74 thereof to move the needle valve 28 from its seat in the aperture through tube 29 extending through the bottom of the cup 26. Thereupon used oil in the cup 26 begins to flow through the tube 29 into the viscosity tube 33. When arm 70 of the rock shaft 71 is lifted by the projection 67 of disk 50, the extension 81 thereof is raised so as to be removed from between the projection 80 on pivoted member 79 carried by temperature compensating disk 76 of the timing mechanism. The projection 80 is thereupon moved axially of disk 76 toward the disk by spring action so that the extension 81 of arm 70 rests upon the projection 80 of the pivoted member 79 to maintain the arm 70 in its raised position and the valve 28 open until the pivoted member 79 is actuated to release the extension 81 of the arm 70. Continued rotation of disk 50 causes projection 89 carried upon the face thereof to engage the projection 88 upon the pivoted member 79 after a predetermined time, depending upon the angular relation of disk 76 and the normal position of disk 50. Pivoted member 79 is thereby rocked to remove the projection 80 thereof from beneath the extension 81 of arm 70 to allow rock shaft 71 to be rotated by spring 90 (Fig. 2) to close the valve 28. The angular position of disk 76 relative to the normal position of disk 50 is indicated by the pointer 86 (Fig. 1) since this pointer is carried by the shaft 84 which is effective to rotate disk 76 through beveled gears 83 and 82 (Fig. 3).

It will thus be seen that needle valve 28 in cup 26 is opened by the timing mechanism 12 immediately after starting plunger 55 is depressed and that the valve 28 is maintained open for a period of time determined by the position of the pointer 86 upon the temperature scale 87. The time of valve opening compensates for temperature differences since the hotter the oil, the less viscous it is and, therefore, to compensate for this effect, the time of valve opening should be less. The time of valve opening may be controlled by any other suitable means which will close the valve after a predetermined time and which may be varied to compensate for temperature. The height which the oil reaches in viscosity tube 33 during this time is read upon the scale 38 (Fig. 1) in either S. A. E. or Saybolt second units. Thus the viscosity of used oil at any temperature within the range of the machine may be quickly and accurately determined. The position of the upper end of tube 29 substantially in the center of the body of oil in cup 26, where the temperature of the oil remains substantially constant, and the position of the thermometer bulb closely adjacent to the top of tube 29 produce extremely accurate results. In practice a very small quantity of oil is withdrawn from the cup 26 intermediate the upper and lower surfaces of the body of oil so that the head causing the oil to flow through tube 29 remains substantially constant and the temperature of the oil flowing through the tube remains substantially constant.

Depression of starting plunger 55 also depresses plunger 113 positioned therebelow to carry this plunger downwardly and cause the pivoted pawl of arm 115 carried by the plunger 113 to strike one of the radial projections 116 on the rotary member 101 of the solids determining mechanism to rotate the member 101 ninety degrees in a clockwise direction in Fig. 2. This rotates the rotary member 101 to position the screen 105 thereof directly between a lamp 117 and a photo-electric cell 118 positioned on opposite sides of the rotary member.

Also upon depression of starting plunger 55, the cam projection 126 carried thereby intermediate its ends strikes the right end of the aperture 125 in the interlocking slide 121 to move the slide toward the right (Fig. 2). Movement of interlocking slide 121 toward the right operates arm 124 of switch 99 to energize the light 117 of the solids determining device 14. The amount of light passing through the screen 105 and striking the photo-electric cell 118 is indicated by the milliammeter 119, which indicates the amount of harmful solids carried by the used oil. Switch 99 also energizes light 98 of the color comparing device 13 so that the used oil in chamber 96 of this device may be compared with a sample of unused oil in chamber 95 by transmitted or refracted light. The used oil in chamber 96 gradually leaks out of the aperture 97 in the bottom of chamber 96 so as to leave a film of dark oil on the glass and to prepare the color comparing device for cleaning as hereinafter described.

Movement of interlocking slide 121 toward the right also releases the resetting plunger 100 by withdrawing the right end of aperture 155 of the interlocking slide 121 from the notch 157 in the resetting plunger 100 and also carries the arm 124 of the switch 99 past dead center so that the spring of the switch urges the slide 121 further toward the right to position the left end of aperture 125 against the starting plunger 55. Upon release of starting plunger 55, this plunger is carried upward by the spring 127, and the right end of the aperture in the slide 121 snaps into the notch 128 of starting plunger 55 to lock this plunger against actuation until slide 121 has been moved to the left by resetting plunger 100. Return of starting plunger 55 allows the plunger 113 to be moved upwardly by spring 116' so that pivoted pawl 115' snaps past the radial projection 116 of rotary member 101 of the solids determining device to be in position to again rotate the member 101.

At this time the operator reads the viscosity of the oil upon scale 34 or 35 and the amount of solids contained in the oil upon scale 120 of the milliammeter and may compare the colors of the used and unused oil in color comparing device 13.

As soon as these readings have been made, the operator depresses resetting plunger 100 to condition the machine for another test. Upon depression of resetting plunger 100, the arm 158 adjacent the top end thereof strikes the rack 159 which meshes with gear 39 secured to the pulley 40 to depress the rack and cause rotation of the pulley 40 in a counterclockwise direction in Fig. 6 through one revolution. Since pulley 40 and gear 39 are loose upon shaft 37, disk 50 remains stationary. Spring detent 48 upon pulley 40 snaps past the detent 49 upon pulley 50, and the timing mechanism is thus reset for another actuation. Depression of resetting plunger 100 also carries downwardly the arm 139' thereof so that this arm strikes the operating lever of drain valve 25 of the cup 26 to open this valve and cause said operating lever to be engaged by latch 23 to retain the valve opened.

Also depression of resetting plunger 100 causes the wedge-shaped projection 156 mounted thereon to engage the left end of aperture 155 in the interlocking slide 121 to move the slide toward the left. This movement of the slide 121 actuates the arm 124 of switch 99 to de-energize the lights 117 and 98 of the solids determining device 14 and the color comparing device 13, respectively. Movement of the slide toward the left also removes the left end of aperture 125 of the slide 121 from the notch 128 in the starting plunger 55 so as to release this plunger for a subsequent actuation. Spring-propelled arm 124 of the switch 99 urges the slide 121 further toward the left to cause the right end of aperture 155 thereof to press against resetting plunger 100 so as to engage in the notch 157 thereof and lock the said resetting plunger when it is again allowed to return to its uppermost position.

Depression of resetting plunger 100 also causes arm 138 thereof to engage the plunger 113 of the solids determining device to rotate the rotary member 101 ninety degrees in a clockwise direction (Fig. 2) as hereinbefore described. This completely inverts screen 105 so that the solids carried thereby are on the under surface of the screen. Also the lower end of resetting plunger 100 engages the valve operating plunger 136 to force this plunger down and open valve 36 in the lower end of the viscosity tube 33, whereby the used oil in the viscosity tube may drain therefrom. When plunger 136 is in its lowermost position, the latch 137 engages thereover to retain it in this position until again released by the starting plunger 55.

The lower end of resetting plunger 100 also engages the plunger 131 of the cleaning device to pull down the piston 130 in the cylinder 129 to draw in a charge of washing fluid through the pipe 134. When resetting plunger 100 is released, it is immediately returned to its uppermost position by spring 139 and is locked in that position by interlocking slide 121. This allows the plunger 113 of the solids determining device to be returned to its uppermost position by spring 116'.

Also the releasing of resetting plunger 100 allows the plunger 131 of the cleaning device to be carried upward by spring 132 to move the piston 130 upwardly in the cylinder 129. Piston 130 forces the charge of cleaning fluid contained in cylinder 129 through pipe 150 and branch pipes 151, 152, 153, and 154 to deliver cleaning fluid onto the screen 105 of the solids determining device 14, into the chamber 96 of the color comparing device, into the viscosity tube 33, and into the cup 26, respectively. This washing fluid washes the solids from the lower surface of the screen 105 and leaves the solids determining device 14 in condition to receive another charge of used oil. The cleaning fluid also washes the used oil from chamber 96 of the color comparing device 13 through the aperture 97 in the bottom thereof. Also the cleaning fluid washes the used oil from viscosity tube 33 through the valve 36 which was opened by the resetting plunger 100. Likewise cleaning fluid is delivered into the cup 26 to wash the used oil therefrom through the drain valve 25, also opened by the resetting plunger 100. Thus depression and release of the resetting plunger washes used oil from the entire machine and conditions the apparatus to receive another charge of used oil for another test.

Fig. 9 shows a modification which may be substituted for a portion of the temperature compensating and timing device shown in Figs. 1 to 8. In this device a disk 161 is secured to a shaft 162 which corresponds to the shaft 37 of the modifications of Figs. 1 to 8. Disk 161 is driven in a clockwise direction in Fig. 9 and is provided with a projection 162' upon the periphery thereof which strikes a projection on an arm 163 carried by a rock shaft 164 corresponding to the rock shaft 71 of the modification shown in Figs. 1 to 8. The projection 162' is provided with a cam surface to cause rocking of arm 163 and shaft 164 in a clockwise direction in Fig. 9 to open the needle valve 28. Rock shaft 164 is also provided with an arm 165 diametrically opposed to arm 163. Upon rocking of shaft 164 by the projection 162', the end of arm 165 is engaged by a latch 166 carried by a bell crank 167 pivoted at 168 to the frame of the device. The bell crank 167 is urged in a counterclockwise direction in Fig. 9 by a spring 169 against a stop 170 so that the latch 166 retains the arm 163 in its upper position, thus maintaining valve 28 open. A knob 171 carrying a cam projection 172 is also mounted upon shaft 162 for rotation relative thereto but is frictionally secured thereto so that relative rotation is resisted.

The projection 172 terminates adjacent the periphery of the disk 161 and may be placed at any angular position relative to the disk 161 by turning knob 171 when the disk 161 is held stationary. The disk 161 may be provided with a temperature scale 173 for the same purpose as the temperature scale 87 of Fig. 1. Continued rotation of shaft 162 and disk 161 after the projection 162' has raised the arm 163 will cause the cam projection 172 to strike a projection 174 on the bell crank 167 to rock the bell crank about its pivot 168. This rocking motion will disengage the latch 166 from the arm 165 on the shaft 164 to allow the valve 28 to be closed. In incorporating this device into the complete machine, the shaft 162 will preferably be mounted so as to position the disk 161 adjacent an opening in the front of the casing so as to occupy the position of the temperature scale 87 of Fig. 1. This simplified device performs the functions of the more complicated temperature compensating device of the modification disclosed in Figs. 1 to 8 but has the disadvantage that the temperature scale is carried by a rotating member.

A further modification of a simplified temperature compensating device is shown in Fig. 10. In this device a shaft 175 carries a sector-shaped cam 176 secured thereto. A second sector-shaped cam 177 is frictionally mounted upon shaft 175 and may be rotated relative thereto by a knob 178. The cams 176 and 177 are positioned closely adjacent each other, and an arm 179 mounted upon a rock shaft 180, corresponding to the rock shaft 164 of Fig. 9, is provided with a cam projection 181 positioned to engage both of the cams 176 and 177. Rocking of the shaft 180 in a counterclockwise direction is effective to open needle valve 28. That is, the arm 179 is shown in Fig. 10 in the position in which the valve 28 is opened. Continued rotation of shaft 175 in a clockwise direction in Fig. 10 under control of the constant speed mechanism will cause cam 177 to disengage projection 181 and allow valve 28 to be closed. By turning knob 178 when shaft 175 and cam 176 are stationary, cam 177 will be rotated relative to cam 176 to vary the angle through which valve 28 is maintained opened and, therefore, the time during which this valve is maintained opened. The cam 176 may be provided with a temperature scale 182 and the two cams positioned adjacent an opening in the front wall of the casing of the device, as stated in the modification of Fig. 9. The operations of the modifications of Figs. 9 and 10 do not affect the other operations of the machine and will be obvious from the above description.

A simpler modification of the entire oil testing device is shown diagrammatically in Fig. 11. This modification includes a viscosity testing device, indicated generally at 183, and a solids content determining device indicated generally at 184. The viscosity testing device includes a used oil viscosity tube 185 and a standard oil viscosity tube 186, by which the viscosity of the used oil is compared with the viscosity of an oil having a known viscosity so as to give a direct reading of the viscosity of the used oil in S. A. E. or any other desired viscosity units. The viscosity tubes 185 and 186 are mounted in a frame (not shown) which also carries an oil inlet structure, indicated generally at 187, and an oil discharge structure indicated generally at 188. The oil inlet structure includes a used oil inlet cup 189 secured to the viscosity tube 185 by packing 190 and carries a tube 191 extending through the bottom thereof so as to conduct oil from the cup 189 into the viscosity tube 185. The upper end of the tube 191 may be closed by a needle valve 192 extending through a guide 193 carried by the tube 191. The needle valve 192 is carried by a plunger 194 slidable in a guide 195 and carrying an operating knob 196. The used oil is delivered into the cup 189 through a cooling tube 197 from a funnel member 198 when the valve 192 is closed and fills the cup 189 up to the level of an overflow tube 199. The viscosity tube 185 is also provided with a vent pipe 200 extending into a space 201 between the bottom of the cup 189 and the top of the viscosity tube 185, and a scale 201' graduated in viscosity units.

The oil inlet structure 187 also includes a cup 202 positioned above the standard oil viscosity tube 186 and secured thereto by packing gland 203. The cup 202 is provided with a tube 204 extending through the bottom thereof so as to deliver oil into the top of the viscosity tube 186. A needle valve 205 for closing the top of tube 204 is also carried by plunger 194 and extends through a guide 206 secured to the tube 204. The cup 202 is also provided with an overflow pipe 207 which extends from adjacent the top of the cup 202 into the space between the cup 202 and top of the viscosity tube 186.

Viscosity tubes 185 and 186 are provided with rotary discharge valves 208 and 209, respectively, which valves form part of a shaft 210 rotatable by an actuating knob 211. Valves 208 and 209 are operable to simultaneously close or open the discharge ends of the tubes 185 and 186, respectively. The valve 209 of viscosity tube 186 is connected to a pipe 212 which extends laterally and upwardly to a cylinder 213 provided with a piston 214 operable by a spring-returned plunger 215.

The solids determining device 184 receives a portion of the used oil through overflow pipe 199 from cup 189. The used oil from pipe 199 enters the casing 216 of the solids determining device 184 through a funnel 217 and flows across the upper surface of a mirror 218 positioned in said casing 216 at an angle of approximately forty-five degrees from the horizontal. An electromagnet 219 is positioned below the mirror to have one pole thereof in contact or closely adjacent the bottom surface of the mirror. The magnet 219 retains any solids in the oil which have magnetic properties upon the surface of the mirror, and any solids not having magnetic properties also tend to remain upon the surface of the mirror by adhering to said surface, and also because of a certain amount of roughness of the surface. An electric lamp 220 is positioned within the casing 216 so as to direct light upon the mirror 218, and a photo-electric cell 221 is also positioned in the casing 216 to receive light reflected from the mirror 218. A milliammeter 222 is positioned upon the top of the casing 216 and is connected to photo-electric cell 221 so as to indicate the intensity of the light reflected from the mirror 218.

The operation of the modification of the device shown in Fig. 11 is as follows. A quantity of oil of known viscosity is normally contained in cylinder 213 and standard oil viscosity tube 186. In preparation for testing a quantity of used oil, knob 211 is turned to open discharge valve 209 of tube 186. Piston 214 is thereupon depressed by plunger 215 to force standard oil upwardly in viscosity tube 186 and into cup 202. At this time the needle valve 205 is preferably closed so that the oil enters cup 202 through overflow pipe 207. Plunger 215 is thereupon released to cause the piston 214 to withdraw the oil from viscosity tube 186 so as to leave oil in cup 202 up to the level of the overflow into pipe 207. Knob 211 is then turned to close the discharge valves 208 and 209. With needle valves 195 and 205 remaining closed, used oil is poured into funnel 198 and allowed to run through the cooling coil 197 into the cup 189. The cooling coil 197 brings the used oil to substantially room temperature. Cup 189 is filled up to the level of overflow pipe 199 and a portion of the used oil allowed to flow through pipe 199 into the solids determining device 184.

At this time the cup 189 is filled with used oil up to the level of overflow pipe 199, and the cup 202 is filled with oil having a standard viscosity up to the overflow level of pipe 207. The plunger 196 is then raised to open needle valves 192 and 205. These needle valves are maintained open until the oil in standard viscosity tube 186 reaches a predetermined level indicated by a graduation 223 on the tube 186, at which time the plunger 196 is lowered to close the needle valves 192 and 205. The viscosity of the used oil is indicated by the height of the used oil in viscosity tube 185, and this height may be read upon the scale 201' in terms of S. A. E. or any desired viscosity units. The knob 211 is then turned to open discharge valves 208 and 209 so that the used oil may drain from viscosity tube 185.

The overflow oil from pipe 199 flows over the mirror 218 in the solids determining device 184 so that harmful solid material carried in the oil is left upon mirror 218, especially magnetic material which is retained upon the mirror by the magnet 219. Solids left upon the surface of the mirror 218 interrupt the light from the lamp 220 to an extent depending upon the amount of solids present in the used oil, and the reading of the milliammeter 222 indicates the amount of solids in the used oil.

In Fig. 12 is shown a modification of the valves for controlling the entrance of oil into the viscosity tubes of a testing device similar to that shown in Fig. 11. In this modification inlet cups 224 and 225 for oil of standard or known viscosity and for used oil, respectively, are provided. A metering tube 226 extends through the bottom of cup 224 to direct the standard oil into a viscosity tube 227 positioned therebelow, and a similar metering tube 228 extends through the bottom of cup 225 to direct used oil into the viscosity tube 229. A slide valve 230 reciprocable in guides 230' is positioned beneath the lower ends of tubes 226 and 228 and is provided with apertures 231 and 232 registering with the passageways in tubes 226 and 228, respectively, when the slide is in the position shown in Fig. 12. A float 233 is positioned within tube 223 and is provided with an upwardly extending rod 234 having oppositely disposed spaced cam projections 235 and 236. The rod 234 extends through an elongated aperture 237 in the slide 230 so that the cam projection 235 moves slide 230 to the left to open the ends of tubes 226 and 228 when the float is allowed to fall to its lowermost position. Also the cam projection 236 forces slide 230 to the right to close the ends of tubes 226 and 228 when the float 223 is in its uppermost position. A latch 238 is adapted to engage under a projection 239 on the upper end of the rod 234 to retain the float in its upper position, and the tubes 226 and 228 closed until the latch is manually released.

In the operation of this device, the float is held in its uppermost position by the latch 238 to retain the tubes 226 and 228 closed. A measured quantity of oil of standard viscosity is placed in cup 224 and a similarly measured quantity of used oil having substantially the same temperature as the standard oil is placed in cup 225. The latch 238 is then tripped to allow the float 223 to fall and actuate the slide 230 to open tubes 226 and 228. Standard oil and used oil then flow through the metering tubes into viscosity tubes 227 and 229, which at this time are closed at their lower ends, until the oil in viscosity tube 227 raises float 233 to close the tubes 226 and 228. The height of the used oil in tube 229 will be a measure of the viscosity of this oil, and a suitable scale (not shown) may be provided so as to permit reading of the height of the oil in any desired viscosity units.

The modification shown in Fig. 13 differs from that of Fig. 12 only in the means for operating the slide for closing the lower end of metering tubes 226 and 228. In this modification a slide 239' reciprocable in guides 240 is urged toward the right to the closed position by a spring 241. A latch 242 pivoted at 243 is adapted to engage a projection 244 on the left end of the slide 239' to hold the slide in open position. One end of the latch 244 is positioned adjacent a pole of an electromagnet 245 so as to be moved thereby to release the slide 239' when the electromagnet is energized. A float 246 in viscosity tube 227, provided with an upwardly extending contact member 247, is adapted to be raised by oil flowing into the tube 227 to cause the contact member 247 to engage a spring contact member 248 held in the path thereof by an insulated cam projection 249 thereof bearing against the slide 239' when it is in the open position. Engagement of contact members 247 and 228 completes a circuit through the electromagnet 245 and battery 250 to energize said magnet and trip the latch 242. Slide 239' is thereby released and pulled toward the right by spring 241 so that insulated projection 249 is no longer engaged by the slide 239'. Spring contact member 248 thereupon moves upwardly away from contact member 247 to break the circuit through the electromagnet.

In operation, the viscosity tubes 227 and 229 are empty and closed at the bottom at the beginning of a test and the float 246 is in its lowermost position. The slide 239' is manually moved toward the left to open position so as to force the spring contact member 248 downwardly into the path of contact member 247. The slide 239' is maintained in open position by latch 242. Oil of standard viscosity and used oil then flow through the metering tubes into viscosity tubes 227 and 299, respectively, until the oil in viscosity tube 227 raises the float 246 to cause the contact member 247 to engage spring contact member 248. Electromagnet 245 is thereby energized to release the slide 239 so as to close the metering tubes 226 and 228 and cause spring contact member 248 to break the circuit through the electromagnet. The height of the used oil in the viscosity tube 229 may then be read by a scale (not shown) calibrated in any desired viscosity units.

In Fig. 14 is shown another modification of the viscosity tester in which a float actuates an indicator to give a direct reading of the viscosity of the oil being tested. This modification includes a viscosity testing chamber 251, a timing device indicated generally at 252, and a float and indicator mechanism indicated generally at 253. The viscosity tube 251 is provided with an inlet tube 254 through the top thereof from a source of used oil (not shown), which used oil has preferably been brought to a definite temperature. The viscosity testing chamber 251 is further provided with a manually operable drain valve 255 for draining the used oil after a test. A float 256 forming part of the float and indicator mechanism 253 is positioned within the viscosity chamber and is provided with an upwardly extending rack 257 slidable in an aperture 258 in the top cover of the viscosity tube. The rack 257 is formed with gear teeth 259 upon one edge thereof meshing with a gear 260 journaled at 261 and carrying a pointer 262 having its outer end adjacent an arcuate viscosity scale 263. The other edge of the rack 257 is formed with relatively fine detent teeth 264 which are adapted to be engaged by a detent member 265 pivoted at 266 to lock the rack 257 and indicator in fixed position. The detent member is urged toward locking position by a spring 267 and may be maintained in unlocking position by a pivoted latch 268. The pivoted latch is urged toward latching position by a spring 269 and is provided with an operating handle 270.

The timing device 252 includes a rotary member 271 mounted upon a stub shaft 273 and having a lug 272 to trip the latch 268. The rotary member 271 is driven by a constant speed mechanism (not shown) which moves the rotary member at constant speed in a clockwise direction in Fig. 14. The rotary member 271 may be manually rotated in a counterclockwise direction to engage the lug 272 behind a projection 274 pivoted on a starting lever 275 to reset the timing device. Constant speed mechanism are old and well-known, and since any conventional mechanism may be used, it is not believed necessary to give further details thereof. If desired the constant speed mechanism may be made adjustable to different constant speeds so as to compensate for different oil temperatures. The starting lever is connected to an arm 276 of the detent member 265 by a rod 277 having one end pivotally secured to the starting lever and the other end pivotally secured to the outer end of the arm 276 so that depression of the starting lever to release the timing device also withdraws the detent member from locking engagement with the detent latch 264 of the rack 257.

In operation, in order to prepare the device for a test, the starting lever 275 is depressed to withdraw the detent member 265 from locking engagement with the rack 257 to allow the float 256 to fall to its lowermost position. The spring-pressed latch 268 engages the detent member to hold it in unlocked position and the starting lever in its downward position. The rotary member 271 of the timing device is then manually rotated to position its lug 272 in position to be engaged by the projection 274 on the starting lever, at which time the latch 268 is manually tripped by its operating handle 270 to allow the spring 267 to return the detent member 265 to locking position and raise the starting lever so as to engage the lug 272 of the timing mechanism. The drain valve 255 is then closed and the viscosity casing 251 filled or nearly filled with oil to be tested. As before stated, the oil may be brought to a predetermined temperature before being placed in the device or the timing device adjusted to compensate for the temperature. Also different temperature can be compensated for by shifting the scale 263. The starting lever is again depressed to release the timing mechanism and to withdraw the detent member from the rack so that it is locked in withdrawn position by the latch 268. The float rises in the oil at a rate depending upon the viscosity of the oil since the float rises more slowly in a high viscosity oil than in an oil of low viscosity. The float continues to rise until the lug 272 of the constant speed mechanism trips the latch 268 to allow the detent member 265 to stop the rack 257 and float. The position of the pointer 262 upon the scale 263 will then indicate the viscosity of the oil.

In Fig. 15 is shown a modified form of viscosity tube which may be used in any viscosity testing device of the type disclosed in this application. As shown in this figure, a transparent or translucent viscosity tube 278 is constructed with a uniform outside diameter and is provided with an inner bore 279 having a diameter which progressively increases from one end of the tube to the other. In general, in viscosity testers, the viscosity of liquid expressed in any of the conventional units of viscosity is not a straight line function of the height of the oil in the viscosity tube. This results in the viscosity graduations being crowded at one end of the tube. By providing a tube with a varying inside diameter, this condition may be corrected to any desired extent so as to enable a scale with uniform graduations to be used or at least a scale with the distance between graduations approaching uniformity. The volume of oil in the tube at the time a reading is made is a function of the viscosity of the oil. With a given volume the height of the oil depends upon the inside diameter or area of the tube. The smaller the diameter of the tube at any portion thereof the greater will be the change in height of oil for a given change in volume and the farther apart corresponding viscosity graduations will be. By progressively varying the inside diameter of the tube the viscosity scale may be spread or contracted as desired. The extent to which the inner diameter of the tube varies will, of couse, depend upon the nature of the viscosity testing mechanism and upon the system of viscosity units used but may readily be calculated for any particular type of device.

Another modification of a viscosity tube for providing more uniform graduations indicating viscosity is shown in Fig. 16. In this modification a transparent or translucent tube 280 is formed with uniform inside or outside diameters. A core 281 having a progressively increasing diameter from one end to the other is positioned within the tube so that the effective interior cross-sectional area of the tube varies from one end of the tube to the other. The core 281 may be maintained in position in the tube in any desired manner which will allow oil to flow into or out of the tube, for example, by small radial members (not shown) extending between the core and the tube wall adjacent the ends of the tube and core.

A further modification of a simplified viscosity tester is shown in Figs. 17 and 18. This device includes a transparent viscosity tube 282 positioned in a supporting member 283 of half tube form with annular ends 284 and 285. A funnel member 286 is screw-threaded into the upper end 284 of the supporting member against the viscosity tube 282, and a valve housing 287 is screw-threaded into the lower annular end 285 of the supporting member against the lower end of the viscosity tube 282. The supporting member also carries a viscosity scale 288 secured thereto adjacent the viscosity tube 282.

The valve housing 287 is provided with a metering orifice 289 communicating with the interior of the viscosity tube and intersected by a rotary valve 290 having an orifice registering with the metering orifice 289 when the valve is in open position. A plate 291 is secured to the valve housing and supports a thermometer 292 having its bulb 293 within the valve housing adjacent the metering orifice 289. The valve 290 extends through the plate 291 and is provided with an actuating knob rigidly secured thereto. A spring 295 positioned in a cavity in the actuating knob 294 is coiled about the valve 290 and urges said valve and actuating knob in a clockwise direction in Fig. 17 to normally position a projection 296 carried by the knob against a stop 297 carried by the plate 291, at which time the valve 290 is in its closed position.

The plate 291 also carries a timing device 298 which includes a constant speed mechanism (not shown) in the interior thereof. The timing device 298 is reset or wound by manual rotation in a counterclockwise direction in Fig. 17 and turns at constant speed in a clockwise direction when released. As constant speed mechanisms are old and well-known, it is not believed necessary to further describe the details thereof. The timing device 298 is provided with ratchet teeth 299 around the periphery thereof engageable by a detent 300 on a tripping member 301 pivoted to the plate 291 at 302 to hold the timing device in any desired position. A spring 303 tends to rotate the tripping member 301 about its pivot to engage its detent 300 with the teeth 299 of the timing device. The pivoted member 301 also carries a projection 304 upon its other end adjacent the valve actuating knob 294 which engages the projection 296 of said knob to retain the valve 290 in open position. The projection 296 is provided with a camming surface, as shown in Fig. 17, which engages the projection 304 of the tripping member 301 to pivot said member and rock the detent 300 thereof away from the teeth 299 of the timing device to release said device when the valve 290 is manually moved to open position. The projection 296 is further provided with a stop portion 305 which maintains the tripping member 301 in released position when the valve 290 is in open position. The timing device is further provided with a cam projection 306 adapted to engage a projection 307 on the tripping member to further pivot this member to release the projection 304 thereof from the projection 296 of the valve knob 294 to permit the valve to be closed by spring 295. The plate 291 may further be provided with temperature graduations 307' surrounding the timing device to enable the projection 306 thereof to be set at any angular position.

In operation the valve 290 is in its closed position at the beginning of a test. A sample of used oil is poured into the viscosity tube 282 through the funnel 286 to fill the tube up to a predetermined height indicated by a graduation upon the scale 288. The temperature of the oil is noted upon the thermometer 292 and the timing device 298 rotated manually in a counterclockwise direction until the cam projection 306 is opposite the temperature graduation on the scale 307' corresponding to the thermometer reading. The timing device is held in this position by the detent 300 of the tripping member 301 engaging the ratchet teeth 299. The knob 294 is then manually given a quick turn in a counterclockwise direction in Fig. 17 to open the valve 290. The projection 296 of said knob engages the tripping member 301 to release the timing device, and the valve is held open by the projection 304 of the tripping member engaging said projection 296. The timing device then turns at constant speed in a clockwise direction in Fig. 17 until the cam projection 306 thereof engages the projection 307 of the tripping member to stop the timing device and to further pivot the tripping member to release the valve knob 294. The valve 290 is thereupon again closed by the spring 295. The used oil in the viscosity tube is thus allowed to flow from the viscosity tube for a predetermined length of time depending upon the setting of the timing device in accordance with the temperature of the oil. The height of the oil remaining in the viscosity tube 283 is a measure of the viscosity of the oil, and the scale 288 is calibrated in any desired viscosity units so that the height of the oil may be read in terms of the viscosity thereof.

In Fig. 19 is a stand which is particularly adapted to support the modification shown in Figs. 1 to 8 but may be used to support any of the modifications disclosed, if provided with a suitable casing. The stand comprises an open-topped tank 308 which may be supported at each corner by a leg 309. The open top of the tank is surrounded by an upper bearing surface 310 in turn surrounded by an upwardly extending flange 311 to receive the lower end of a casing of an oil tester, such as the casing 16 of the modification shown in Figs. 1 to 8. The tank is further provided with a drain plug 312 and a metallic pocket 313 adapted to receive the lower end of an oil gun 314 for withdrawing a definite amount of used oil from the crankcase of an internal combustion engine, which oil gun may be further supported upon the tank by a clip 315 secured thereto.

In Figure 20 is shown a modified form of solids determining device which may be substituted for the solids determining device 14 in the testing device shown in Figs. 1 to 8 or used independently thereof and which is simpler in construction and operation. In this modified form, used oil is delivered by an inlet tube or funnel 316 upon an inclined screen 317 positioned between spaced transparent plates 318 and 319. A source of light such as an electric light 320 is positioned below the plate 319 so as to direct light therethrough and through the screen 317 and plate 318 to a photo-electric cell 321 connected to a meter 322. Used oil from inlet tube 316 runs down and through the inclined screen 317, leaving solid particles carried thereby upon the screen. The amount of light reaching the photo-electric cell 321 from the light 320 is decreased by said solid particles, and the reading of the meter 322 is a measure of the solid content of the oil.

Provision is made for cleaning the screen and other portions of the device after the completion of a test. For this purpose a pipe 323 connected to a source of cleaning fluid under pressure (not shown) is provided with upwardly directed nozzles 324 for spraying cleaning fluid upwardly through the screen and downwardly directed nozzles 325 for directing cleaning fluid upon the glass plate 319. The sprays may have sufficient force so that the fluid from nozzles 324 cleans the transparent plate 318 which protects the photo-electric cell 321. Another nozzle 326 connected to said source of cleaning fluid may be provided to spray cleaning fluid on the top of the screen 317 at the same time that nozzles 324 spray from the bottom.

As shown in Fig. 21, the screen 317 may be pivoted as at 327 so as to be movable into a vertical position against a light spring 328. In this modification the screen is forced to a vertical position by the sprays from nozzles 324 so as to allow the solid particles to fall off more easily.

In Fig. 22 is shown a further modification of the device of Figs. 1 to 8, the principle of which is, however, applicable to the other forms of the invention disclosed. In this modification all means for compensating for temperature are eliminated, and the oil is brought to a standard or predetermined temperature before testing for viscosity, by means of an electric heating element 330 positioned in the cup 26' similar to the cup 26 of Fig. 2. The heating element is energized through a switch 331 from the line 332. Connected in series with the heating element 330 is a thermostat 333 also immersed in the oil in the cup, a signal lamp 334, and the winding of a relay 335. The relay 335 influences a spring armature 336 which normally engages a contact 337 so as to separate said armature from the contact when the relay is energized. A solenoid winding 338 surrounds a tapered magnetic portion 339 of the starting plunger 55' so as to pull down this plunger when the armature 336 engages the contact 337 to complete a circuit from the line 332 and switch 331 through the winding 338. The resetting plunger 100' is provided with a projection 340 for engaging a projection on switch 331 to open this switch when the plunger 100' is depressed.

In operation, oil to be tested is introduced into the cup 26' in the same manner as into the cup 26 of Figs. 1–8. The switch 331 is closed manually, or as an alternative the downward motion of the rod 19 of Fig. 2 could be used to close this switch. A circuit is thereby completed from the line 332 through the winding of relay 335, the heater 330, the thermostat 333, and the lamp 334. A momentary circuit is also completed through the solenoid winding 338, but the inertia of plunger 55' and parts actuated thereby is sufficient to prevent movement of the plunger 55' before the armature 336 is disengaged from the contact 337 to break the circuit through solenoid 338. The heater 330 raises the temperature of the oil until at a predetermined temperature the thermostat 333 breaks, the circuit through the heater 330 and relay winding 335. When this occurs, the armature 336 engages contact 337 to complete the circuit through the solenoid 338, and the starting plunger 339 is pulled downwardly to initiate the operation of the device as in Figs. 1 to 8. A subsequent actuation of restoring plunger 100' opens the switch 331 to disconnect the device from the line 332 until the switch is again closed as described above.

While for purposes of illustration the various modifications of my invention have all been described as being adapted for testing used lubrication oil, it is understood that my invention is capable of being used for testing other liquids. It is further understood that my invention is not to be limited to the precise structure shown but that various changes in details, for example, the provision of automatic temperature compensating means, may be made within the scope of the following claims.

I claim:

1. In a device for testing oil, a viscosity tube, means for metering a flow of oil into said tube, a valve for controlling said flow of oil, means for opening said valve, and timing means settable in accordance with the temperature of said oil for closing said valve after a predetermined time.

2. A device for determining the viscosity of a liquid, comprising a transparent viscosity tube provided with a scale calibrated in viscosity units, an inlet valve for controlling the flow of liquid to be tested into said tube and an outlet valve, one of said valves being connected with a metering orifice for said liquid, means to open said one of said valves, and a timing mechanism settable in accordance with the temperature of said oil for closing said opened valve after a predetermined time.

3. A device for determining the viscosity of a liquid, comprising a vertical tube, a scale calibrated in viscosity units associated therewith for indicating the height of liquid in said tube in terms of viscosity units, a metering valve associated with said tube for controlling the flow of said liquid, means for opening said valve, and timing means settable in accordance with the temperature of the oil for closing said valve after a predetermined time.

4. A device for determining the viscosity of a liquid, comprising a vertical tube, a scale calibrated in viscosity units associated therewith for indicating the height of liquid in said tube in terms of viscosity units, a metering valve associated with said tube for controlling the flow of said liquid, means for opening said valve, timing means for closing said valve after a predetermined time, a temperature responsive means for determining the temperature of said liquid adjacent said metering valve, and means for setting said timing mechanism to vary said predetermined time in accordance with said temperature of said liquid.

5. In a device for determining the viscosity of a liquid, a viscosity tube having a scale associated therewith calibrated in viscosity units for indicating the height of liquid in said tube in terms of viscosity, a metering tube connected with a chamber adapted to be filled with liquid to be tested for delivering said liquid from said chamber into said viscosity tube, a valve for closing said metering tube, a timing mechanism settable in accordance with the temperature of said liquid for opening said valve and for closing said valve after a predetermined time, and means for initiating the operation of said timing mechanism.

6. In a device for determining the viscosity of liquids, a metering member having an aperture therethrough, a valve for opening and closing said aperture, means for opening said valve, and a timing mechanism settable in accordance with the temperature of said liquid for closing said valve after a predetermined time.

7. In a device for determining the viscosity of liquids, a metering member having an aperture therethrough, a valve for opening and closing said aperture, means for opening said valve, a timing mechanism for closing said valve after a predetermined time, and temperature responsive means for indicating the temperature of liquid entering said aperture, said timing means being settable in accordance with the temperature of said liquid to vary said predetermined time to provide for testing liquids of different temperatures.

8. In a device for determining the viscosity of liquids, a metering member having an aperture therethrough, a valve for opening and closing said aperture, means for opening said valve, a timing mechanism for closing said valve after a predetermined time, temperature responsive means for determining the temperature of the liquid entering said aperture, said timing means including a member rotating at constant speed, means for causing said valve to close after said member has rotated through a predetermined angle, and means providing for varying said angle in accordance with the temperature of the liquid entering said aperture.

9. A device for determining the viscosity of a liquid comprising a chamber for receiving a body of liquid to be tested, a float positioned in said chamber in contact with said body of liquid so as to normally have relative movement therewith at a rate determined by the viscosity of said liquid, means to releasably hold said float below the surface of said liquid, a movable indicator operated by said float, means to release said holding means, and means to stop the movement of said float and indicator at a predetermined time after said releasing means has been operated.

10. A device for determining the viscosity of a liquid comprising an elongated tube of light transmitting material adapted to receive liquid to be tested, a metering orifice connected to the lower portion of said tube, a valve for opening and closing said orifice, means for opening said valve, timing means for closing said valve after a predetermined time, and a scale for indicating the change in height of liquid in said tube, said scale being graduated in viscosity units.

11. A device for determining the viscosity of a liquid comprising a member in contact with a body of said liquid and adapted to normally have relative movement therewith at a rate determined by the viscosity of said liquid, means for initiating said movement, a timing device for stopping said movement after a predetermined time, said timing device being settable in accordance with the temperature of said oil, and a scale for indicating the extent of said movement.

12. In an oil testing device, a mechanism for testing a characteristic of said oil, means for delivering a quantity of oil into said mechanism, a starting member for initiating the operation of said testing mechanism, means for discontinuing the operation of said mechanism and means for passing a quantity of cleaning fluid therethrough to condition said testing mechanism for a subsequent testing operation.

13. In an oil testing device, a mechanism for testing a characteristic of said oil, means for delivering a quantity of oil into said mechanism, a starting member for initiating the operation of said testing mechanism, means for discontinuing the operation of said mechanism, means for draining said testing mechanism and means for passing a quantity of cleaning fluid therethrough to condition said testing mechanism for a subsequent testing operation.

14. In an oil testing device, a mechanism for testing a characteristic of said oil, means for delivering a quantity of oil into said mechanism, a starting member for initiating the operation of said testing mechanism, means for discontinuing the operation of said mechanism, a resetting member for conditioning said mechanism for a subsequent testing operation, and interlocking means between said members for preventing successive operations of either one of said members.

15. A device for determining the viscosity of a liquid, said device comprising a vessel adapted to receive liquid to be tested, a metering orifice connected to the lower portion of said vessel, a valve for opening and closing said orifice, means for opening said valve, timing means for closing said valve after a predetermined time, and a scale for indicating the change in height of liquid in said vessel.

16. A device for determining the viscosity of a liquid, said device comprising, a chamber for receiving a body of liquid to be tested, a float positioned in said chamber in contact with said body of liquid so as to normally have relative movement therewith at a rate determined by the viscosity of said liquid, means to releasably hold said float below the surface of said liquid, a movable indicator operated by said float, means to release said holding means, and timing means to stop the movement of said float and indicator at a predetermined time after said releasing means has been operated, said timing means being settable in accordance with the temperature of said liquid.

17. A device for determining the viscosity of a liquid, said device comprising, a chamber for receiving a body of liquid to be tested, a member having a different specific gravity than said liquid positioned in said chamber in contact with said body of liquid so as to normally have relative movement therewith at a rate determined by the viscosity of said liquid, means to releasably hold said member at a predetermined position in said liquid to restrain movement thereof, means to release said holding means whereby said member moves in said liquid, a movable indicator operated by movement of said member, and means to stop the movement of said member and indicator at a predetermined time after said releasing means has been operated.

18. A device for determining the viscosity of a liquid, said device comprising, a member in contact with the body of said liquid adapted to normally have relative movement therewith at a rate determined by the viscosity of said liquid, means for initiating said movement, a timing device for stopping said movement after a predetermined time and a scale for indicating the extent of said movement.

ALBERT G. THOMAS.